(12) United States Patent
Yoneyama et al.

(10) Patent No.: US 9,522,532 B2
(45) Date of Patent: Dec. 20, 2016

(54) INK JET RECORDING APPARATUS AND INK JET RECORDING METHOD

(71) Applicant: FUJI XEROX CO., LTD., Tokyo (JP)

(72) Inventors: Hirohito Yoneyama, Kanagawa (JP); Hiroyuki Ueki, Kanagawa (JP); Mami Hatanaka, Kanagawa (JP); Reika Yomogida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/620,440

(22) Filed: Feb. 12, 2015

(65) Prior Publication Data

US 2016/0082726 A1      Mar. 24, 2016

(30) Foreign Application Priority Data

Sep. 22, 2014   (JP) ................................. 2014-192699

(51) Int. Cl.
  *B41J 2/045*  (2006.01)
  *C09D 11/30*  (2014.01)

(52) U.S. Cl.
  CPC ............ *B41J 2/04586* (2013.01); *C09D 11/30* (2013.01)

(58) Field of Classification Search
  CPC ..................................................... C09D 11/40
  See application file for complete search history.

(56) References Cited

U.S. PATENT DOCUMENTS

| | | | | |
|---|---|---|---|---|
| 5,900,899 A * | 5/1999 | Ichizawa | ................ | C09D 11/40 106/31.86 |
| 6,630,017 B2 * | 10/2003 | Ma | ........................ | C09D 11/40 106/31.58 |
| 2004/0069183 A1 * | 4/2004 | Kamoto | ................. | C09D 11/40 106/31.27 |
| 2004/0103815 A1 * | 6/2004 | Honma | ................... | C09D 11/30 106/31.13 |
| 2007/0120928 A1 * | 5/2007 | Ma | ........................ | C09D 11/38 347/100 |
| 2007/0186812 A1 * | 8/2007 | Koga | ..................... | C09D 11/40 106/31.58 |
| 2008/0239044 A1 * | 10/2008 | Yokota | .................. | B41J 11/002 347/102 |

(Continued)

FOREIGN PATENT DOCUMENTS

| JP | 2006-219625 | 8/2006 |
|---|---|---|
| JP | 2011-127088 | 6/2011 |

OTHER PUBLICATIONS

Abstract and machine translation of JP 2006-219625.

*Primary Examiner* — Stephen Meier
*Assistant Examiner* — John P Zimmermann
(74) *Attorney, Agent, or Firm* — Fildes & Outland, P.C.

(57) ABSTRACT

There is provided an ink jet recording apparatus equipped with an ink for ink jet recording, and a discharge unit that discharges a liquid droplet of the ink onto a recording medium, wherein the ink contains at least a colorant, a polymer particle, a water-soluble organic solvent, and water, and has a dynamic surface tension after 1 msec of 32 mN/m or less, a dynamic surface tension after 1 sec of less than 30 mN/m, when the dynamic surface tension is measured by a maximum bubble pressure method, and has a variation width in the dynamic surface tension for the period from 1 msec after to 1 sec after of from 0.2 mN/m to 3.0 mN/m, a recording speed is from 10 m/min to 50 m/min.

6 Claims, 1 Drawing Sheet

(56) References Cited

U.S. PATENT DOCUMENTS

| | | |
|---|---|---|
| 2011/0118399 A1 | 5/2011 | Koganehira et al. |
| 2011/0242200 A1* | 10/2011 | Tojo ....................... B41M 7/009 |
| | | 347/21 |
| 2012/0281043 A1* | 11/2012 | Hudd ........................ B41J 2/21 |
| | | 347/37 |
| 2014/0253618 A1* | 9/2014 | Masuda ............... B41J 2/04581 |
| | | 347/10 |
| 2015/0267067 A1* | 9/2015 | Ueki ...................... C09D 11/10 |
| | | 347/20 |
| 2016/0023456 A1* | 1/2016 | Yoneyama ................ B41J 2/01 |
| | | 347/20 |

\* cited by examiner

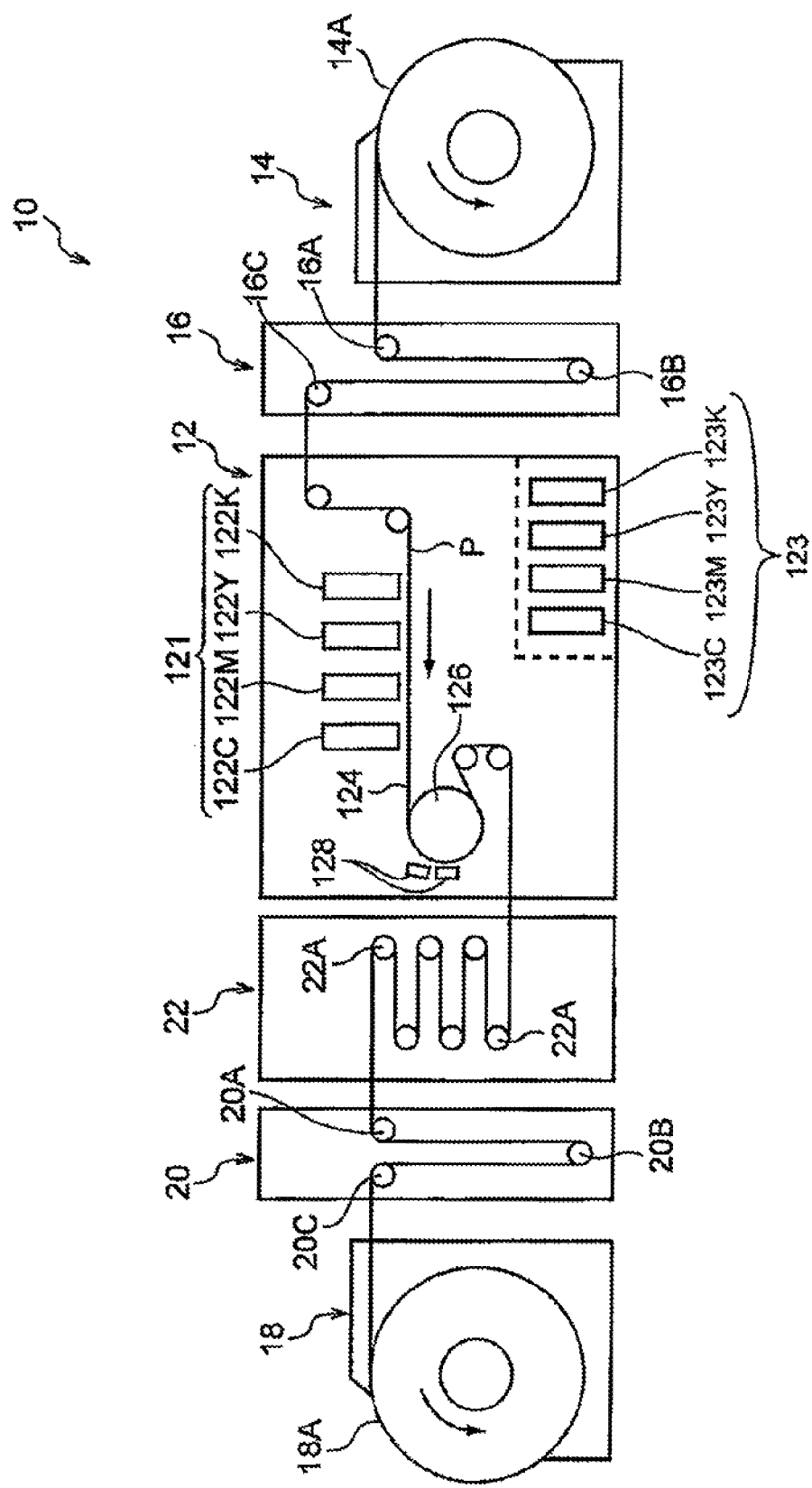

INK JET RECORDING APPARATUS AND INK JET RECORDING METHOD

CROSS-REFERENCE TO RELATED APPLICATIONS

This application is based on and claims priority under 35 USC 119 from Japanese Patent Application No. 2014-192699 filed on Sep. 22, 2014.

BACKGROUND

1. Field

The present invention relates to an ink jet recording apparatus and an ink jet recording method.

2. Description of the Related Art

Recently, in the printing field, ink jet printing techniques remarkably increase therein share since they can be easily performed at a wider bandwidth and a higher speed.

In this ink jet printing, an ink drying step is essential since when sheets are overlaid before an ink is dried, or in the case of a continuous piece of paper, the paper is wound, and then troubles such as show-through occur. Examples of a common ink drying method include drying with hot air and drying on a radiator.

Furthermore, as an ink composition in the related art, those as described in Patent JP-A-2011-127088 and JP-A-2006-219625, for example, are known.

JP-A-2011-127088 describes an ink composition for ink jet recording, containing at least a colorant, water, a slightly water-soluble alkane diol, a crystalline sugar alcohol which is solid at 20° C., and a (poly)alkylene glycol.

JP-A-2006-219625 describes an ink for ink jet recording, containing a non-aqueous ink, in which the ink is characterized by being cured by being irradiated with light such as ultraviolet rays and electron beams, the dynamic surface tension of the ink at 80 milliseconds is more than 28 mN/m, and in the dynamic surface tension measurement using a maximum bubble pressure method, a value obtained by subtracting the dynamic surface tension value at 1000 milliseconds from the dynamic surface tension value at 80 milliseconds is less than 8 mN/m.

SUMMARY

<1> An ink jet recording apparatus equipped with an ink for ink jet recording, and a discharge unit that discharges a liquid droplet of the ink onto a recording medium, wherein the ink contains at least a colorant, a polymer particle, a water-soluble organic solvent, and water, and has a dynamic surface tension after 1 msec of 32 mN/m or less, a dynamic surface tension after 1 sec of less than 30 mN/m, when the dynamic surface tension is measured by a maximum bubble pressure method, and has a variation width in the dynamic surface tension for the period from 1 msec after to 1 sec after of from 0.2 mN/m to 3.0 mN/m, a recording speed is from 10 m/min to 50 m/min.

BRIEF DESCRIPTION OF THE DRAWINGS

FIGURE is a schematic configuration diagram showing an example of an ink jet recording apparatus of the exemplary embodiment of the invention.

In FIGURE, 10 denotes Ink Jet Recording Apparatus, 12 denotes Image Recording Unit, 14 denotes Pre-treatment Unit, 14A denotes Supply Roll, 16 denotes Buffer Unit, 16A denotes First Pass Roller, 16B denotes Dancer Roller, 16C denotes Second Pass Roller, 18 denotes Post-Treatment Unit, 18A denotes Winding Roll, 20 denotes Buffer Unit, 20A denotes First Pass Roller, 20B denotes Dancer Roller, 20C denotes Second Pass Roller, 22 denotes Cooling Unit, 22A denotes Cooling Roller, 121 denotes Discharge Device, 122, 122K, 122Y, 122 M and 122C denote Discharge Head, 123, 123K, 123Y, 123M and 123C denote Ink Cartridge, 124 denotes Transport path, 126 denotes Drying Drum, 128 denotes Hot-Air Blowing Device, P denotes Recording Medium.

DETAILED DESCRIPTION

Hereinafter, the exemplary embodiment of the invention will be described in detail. In the present specification, "A to B" refers to a range including the lower limit and the upper limit thereof, that is, A and B as well as a range between A and B.

(Ink Jet Recording Apparatus and Ink Jet Recording Method)

An ink jet recording apparatus of the exemplary embodiment of the invention (hereinafter simply referred to as a "recording apparatus") is provided with an ink for ink jet recording, containing at least a colorant, a polymer particle, a water-soluble organic solvent, and water, and having a dynamic surface tension after 1 msec of 32 mN/m or less, a dynamic surface tension after 1 sec of less than 30 mN/m, and a variation width in the dynamic surface tension for the period from 1 msec after to 1 sec after of from 0.2 mN/m to 3.0 mN/m, when the dynamic surface tension is measured by a maximum bubble pressure method; and has a discharge unit that discharges a liquid droplet of the ink onto a recording medium, in which the recording speed is from 10 m/min to 50 m/min.

The ink jet recording method of the exemplary embodiment of the invention (hereinafter simply referred to as a "recording method") includes a discharge step of discharging a liquid droplet of an ink onto a recording medium, in which the ink contains at least a colorant, a polymer particle, a water-soluble organic solvent, and water, and has a dynamic surface tension after 1 msec of 32 mN/m or less, a dynamic surface tension after 1 sec of less than 30 mN/m, and a variation width in the dynamic surface tension for the period from 1 msec after to 1 sec after of from 0.2 mN/m to 3.0 mN/m, when the dynamic surface tension is measured by a maximum bubble pressure method, and the recording speed is from 10 m/min to 50 m/min.

A high-speed ink jet recording apparatus (for example, at 10 m/min or more) using aqueous ink requires a drying unit that dries an ink to inhibit offset. However, the drying unit consumes a lot of power. In the case of not using a drying unit, a plain piece of paper having high permeability is used, therefore, it takes time to be air-dried, and thus, it is necessary to slow down the printing speed.

The present inventors conduct intensive investigations and as a result, they find that by using an ink containing the specific components and having each value of the dynamic surface tension in a specific range, the ink can inhibit the occurrence of peeling in an image even at a recording speed of 10 m/min to 50 m/min.

The detailed mechanism is not clear, but it is presumed that the specific ink has excellent drying properties which allow easy wetting and excellent spreading, thereby making a drying unit unnecessary, and by the incorporation of a polymer particle, fixing properties of the specific ink become excellent, and thus, the occurrence of peeling in an image is inhibited.

The recording speed (printing speed) of the ink jet recording apparatus and the ink jet recording method of the present embodiment is from 10 m/min to 50 m/min (10 m to 50 m every minute), preferably from 20 m/min to 50 m/min, and more preferably from 20 m/min to 40 m/min.

The ink jet recording apparatus and the ink jet recording method of the exemplary embodiment of the invention can perform image formation even at a recording speed as high as that described above.

The ink jet recording apparatus and the ink jet recording method of the exemplary embodiment of the invention do not require a drying unit that dries an ink on a recording medium, and preferably, the ink jet recording apparatus and the ink jet recording method do not have a drying unit or do not use the drying unit. When they do not have the drying unit or do not use the drying unit, power consumption is decreased, and as a result, the ink jet recording apparatus and the ink jet recording method are excellent in terms of cost and diverge less heat to the periphery of the recording apparatus.

[Discharge Unit and Discharge Step]

The ink jet recording apparatus of the exemplary embodiment of the invention has a discharge unit that discharges a liquid droplet of the ink onto a recording medium via an ink jet head.

The ink jet recording method of the exemplary embodiment of the invention includes a discharging step of discharging a liquid droplet of the ink onto a recording medium by an ink jet head.

The ink jet head used for discharging the ink liquid droplet is not particularly limited, and a known ink jet head is used. Examples thereof include a piezo type ink jet head and a thermal type ink jet head.

The discharge temperature of the ink is not particularly limited and can be adjusted according to the ink used.

In the ink jet recording method of the exemplary embodiment, ink discharge may be carried out several times, if necessary. For example, one kind of ink may be discharged several times onto the same position of a recording medium, or two or more kinds of inks may be discharged and one or two inks may be discharged several times.

One kind or two or more kinds of the inks used in the exemplary embodiment of the invention may be used. For example, in the case of forming a color image, an ink in any color among cyan, magenta, yellow, and black is suitably used.

In the ink jet recording apparatus of the exemplary embodiment of the invention and the ink jet recording method of the exemplary embodiment of the invention, the liquid mass per drop of an ink liquid droplet is preferably 25 ng or less, more preferably from 0.5 ng to 20 ng, and still more preferably from 2 ng to 15 ng. Through this embodiment, drying properties are excellent, and thus, the occurrence of peeling in an image is further inhibited.

Further, in an ink jet device capable of jetting a varying volume of droplets from a single nozzle, the liquid mass per drop is intended to represent the amount of a minimum printable droplet.

The ink jet recording apparatus of the exemplary embodiment of the invention and the ink jet recording method of the exemplary embodiment preferably employ a thermal ink jet recording system or a piezo ink jet recording system, from the viewpoint of an effect of improving blurring and blurring between the colors. The mechanism which causes this effect is not clear, but in the case of the thermal ink jet recording system, the ink is heated during the discharging, and thus becomes less viscous, the temperature of the ink on the recording medium is lowered, and accordingly, the viscosity is drastically increased. Based on this, it is thought that there is an effect of improving blurring and blurring between the colors. On the other hand, in the case of the piezo ink jet system, a high-viscosity liquid can be discharged, and the high-viscosity liquid can be inhibited from being diffused toward the paper surface on the recording medium, and therefore, it is presumed that there is an effect of improving the blurring and blurring between the colors.

In the ink jet recording apparatus of the exemplary embodiment of the invention and the ink jet recording method of the exemplary embodiment of the invention, the distribution (supply) of the ink into an ink jet head is preferably carried out from an ink tank that accommodates an ink. This ink tank is preferably a cartridge system which is attachable to or detachable from a device, and the ink distribution is simply carried out by replacing the ink tank of this cartridge system.

In addition, preferable examples of the ink supply system include embodiments including an original ink-containing tank, a supply wire, an ink tank immediately before an ink jet head, a filter, and a piezo type ink jet head.

[Recording Medium]

The recording medium used in the ink jet recording apparatus of the exemplary embodiment of the invention and the ink jet recording method of the present embodiment is not particularly limited and a known recording medium is used.

As the recording medium, a permeable recording medium is preferably used. Through the embodiment, excellent drying properties and further inhibition of the occurrence of peeling in an image are attained.

Further, examples of the permeable recording medium include plain paper. Specifically, the permeable recording medium means a recording medium in which the maximum liquid absorbency of the ink up to a contact time of 500 ms, as measured by a dynamic scanning liquid absorption system, is greater than 15 mL/m$^2$.

On the other hand, examples of the non-permeable recording medium include coating paper and resin film. Specifically, the non-permeable recording medium means a recording medium in which the maximum liquid absorbency of the ink up to a contact time of 500 ms, as measured by a dynamic scanning liquid absorption system, is 15 mL/m$^2$ or less.

In addition, as the recording medium, a roll of paper or a continuous piece of paper is preferably used, and the roll of paper is particularly preferably used. Through these embodiments, the effect of the present embodiment is further exerted.

The ink jet recording apparatus of the exemplary embodiment of the invention has a recording speed of 10 m/min to 50 m/min and has no drying unit as described above, and in addition, for example, the configuration of a known ink jet recording apparatus with respect to a transporting unit or a control unit of each part of the recording medium is preferably used for the ink jet recording apparatus.

Incidentally, the ink jet recording method of the exemplary embodiment of the invention is preferably carried out, using the ink jet recording apparatus of the present embodiment.

Hereinafter, an example of each of the ink jet recording apparatus of the exemplary embodiment of the invention and the ink jet recording method of the exemplary embodiment will be described with reference to a drawing.

FIGURE is a schematic configuration diagram showing an example of an ink jet recording apparatus of the exemplary embodiment of the invention.

An ink jet recording apparatus 10 is a recording apparatus provided with a discharge head 122 (a discharge device 121 having the discharge head 122) that discharges aqueous ink (hereinafter also referred to as an "ink") onto a recording medium P, as shown in FIGURE. In the ink jet recording apparatus 10, an ink jet recording method including a discharge step of discharging an ink onto the recording medium P is realized. Thus, the image is recorded on the recording medium P using the ink.

Specifically, the ink jet recording apparatus 10 is provided with, for example, an image recording unit 12 that records an image on a continuous piece of paper (hereinafter also referred to as a "continuous piece of paper P") as the recording medium P.

The ink jet recording apparatus 10 is provided with a pro-treatment unit 14 that accommodates the continuous piece of paper P supplied to the image recording unit 12, and a buffer unit 16 that adjusts the amount of the continuous piece of paper P supplied from the pre-treatment unit 14 to the image recording unit 12, or the like. The buffer unit 16 is arranged between the image recording unit 12 and the pre-treatment unit 14.

The recording apparatus 10 is provided with, for example, a post-treatment unit 18 that accommodates the continuous piece of paper P supplied from the image recording unit 12, and a buffer unit 20 that adjusts the amount of the continuous piece of paper P supplied from the image recording unit 12 to the post-treatment unit 18, or the like. The buffer unit 20 is arranged between the image recording unit 12 and the post-treatment unit 18.

The recording apparatus 10 is arranged between the image recording unit 12 and the buffer unit 20, and is provided with a cooling unit 22 that cools the continuous piece of paper P transported from the image recording unit 12.

The image recording unit 12 is provided with, for example, a roll member (a symbol thereof omitted) that guides the continuous piece of paper P along a transport path 124 of the continuous piece of paper, and a discharge device 121 that discharges an ink (liquid droplets of the ink) onto the continuous piece of paper P transported along the transport path 124 of the continuous piece of paper P so as to record the image.

The discharge device 121 is provided with the discharge head 122 that discharges the ink onto the continuous piece of paper P. The discharge head 122 is, for example, an elongated recording head having an effective recording region (region having ink discharging nozzles arranged thereon) which is considered to be larger than the width of the continuous piece of paper P (the length in the direction crossing (for example, perpendicular to) the transporting direction of the continuous piece of paper P).

Further, the discharge head 122 is not limited thereto, and may be a discharge head which has a length that is shorter than the width of the continuous piece of paper P, and may be a discharge head of a discharging system that discharges the ink in the width direction of the continuous piece of paper P (a so-called carriage system).

The discharge head 122 may be a thermal system that discharges liquid droplets of the ink due to heat, or may be a piezo system that discharges liquid droplets of the ink due to pressure, and for doing this, a known discharge head is applied.

The discharge head 122 has, for example, a discharge head 122K that discharges an ink onto the continuous piece of paper P in order to record an image in a K (black) color, a discharge head 122Y that records an image in a Y (yellow) color, a discharge head 122M that records an image in an M (magenta) color, and a discharge head 122C that records an image in a C (cyan) color. Further, the discharge heads 122K, 122Y, 122M, and 122C are aligned in this order so as to face the continuous piece of paper P on the downstream side from the upstream side along the transporting direction of the continuous piece of paper P (hereinafter also simply referred to as a "paper transporting direction" in some cases). Further, in the case where in description of the discharge heads, K, Y, M, and C are discriminated, K, Y, M, and C are not attached to the symbols.

Each of the discharge heads 122K, 122Y, 122M, and 122C is connected to an ink cartridge 123K, 123Y, 123M, or 123C of each of the colors, which is attachable to or detachable from the ink jet recording apparatus 10 through a supply tube (not shown), and the inks of the respective colors are supplied to the respective discharge heads 122 by the ink cartridge 123.

The discharge head 122 is not limited to a configuration in which 4 discharge heads 122 each corresponding to the respective 4 colors above are arranged, and according to the purpose, a configuration in which 4 or more discharge heads 122 each corresponding to 4 or more colors which other intermediate colors are added, may be allowed to be arranged.

Here, the discharge head 122 may be provided with, for example, either a discharge head 122 for low resolution (for example, a discharge head for 600 dpi) that discharges an ink in an amount from the size of an ink droplet to 15 pl, or a discharge head 122 for high resolution (for example, a discharge head for 1,200 dpi) that discharges an ink in an amount from the size of an ink droplet to less than 10 pl. Further, the discharge device 121 may be provided with both the discharge head 122 for low resolution and the discharge head 122 for high resolution. The ink liquid droplets discharged from the discharge head 122 are near the maximum size. In addition, dpi means "dots per inch".

The discharge device 121 is provided with, for example, a drying drum 126 (an example of a drying device) that dries an image (ink) on the continuous piece of paper P while drivenly rotating in contact with the transported continuous piece of paper P, when the back surface of the continuous piece of paper P is wound, on the downstream side of the paper transporting direction with respect to the discharge head 122.

A heating source (for example, a halogen heater: not shown) is built inside the drying drum 126. The drying drum 126 dries an image (ink) on the continuous piece of paper P by beating the image with a heating source.

Around the drying drum 126, a hot-air blowing device 128 (an example of a drying device) that dries an image (ink) on the continuous piece of paper P is arranged. Due to the hot air from the hot-air blowing device 128, the image (ink) on the continuous piece of paper P wound in the drying drum 126 is dried.

Here, in the discharge device 121, another drying device such as a near-infrared ray heater (not shown) that dries an image (ink) on the continuous piece of paper P and a laser irradiation device may be arranged on the downstream side in the paper transporting direction with respect to the discharge head 122. Another drying devices such as the near-infrared ray heater and the laser irradiation device are arranged in place of at least one of the drying drum 126 and the hot-air blowing device 128, or in addition to the drying drum 126 and the hot-air blowing device 128.

In addition, in the exemplary embodiment of the invention, the drying drum 126 and the hot-air blowing device 128 may not be present or may not be used even when it is present.

On the other hand, the pre-processing unit 14 is provided with a supply roll 14A on which the continuous piece of paper P supplied to the image recording unit 12 is wound, and the supply roll 14A is rotatably supported by a frame member not shown.

In the buffer unit 16, for example, a first pass roller 16A, a dancer roller 16B, and a second pass roller 16C are arranged along the paper transporting direction. The tension of the continuous piece of paper P transported to the image recording unit 12 and the amount of the transported continuous piece of paper P are adjusted by moving the dancer roller 16B up and down as shown in FIGURE.

The post-treatment unit 18 is provided with a winding roll 18A as an example of a transporting unit that winds the continuous piece of paper P having an image recorded thereon. By rotating the winding roll 18A via a rotational force from a motor not shown, the continuous piece of paper P is allowed to be transported along the transport path 124.

In the buffer unit 20, for example, a first pass roller 20A, a dancer roller 20B, and a second pass roller 20C are arranged along the paper transporting direction. By moving the dancer roller 16B up and down as shown in FIGURE, the tension of the continuous piece of paper P discharged to the post-treatment unit 18 and the amount of the transported continuous piece of paper P are adjusted.

In the cooling unit 22, plural cooling rollers 22A are arranged. By transporting the continuous piece of paper P among the plurality of cooling rollers 22A, the continuous piece of paper P is cooled.

In the exemplary embodiment of the invention, the cooling unit 22 may not be used.

Next, the operation (recording method) of the ink jet recording apparatus 10 according to the exemplary embodiment of the invention will be described.

In the recording apparatus 10 according to the exemplary embodiment of the invention, first, the continuous piece of paper P is transported from the supply roll 14A of the pro-treatment unit 14 to the image recording unit 12 through the buffer unit 16.

Next, in the image recording unit 12, the ink is discharged from each discharge head 122 of the discharge device 121 to the continuous piece of paper. Thereby, an image is formed of the ink on the continuous piece of paper P. Thereafter, with the drying drum 126, the image (ink) on the continuous piece of paper P is dried from the side of the back surface (surface in the opposite to the recording surface) of the continuous piece of paper P. Further, with the hot-air blowing device 128, the ink (image) discharged onto the continuous piece of paper P is dried from the surface side (recording surface) of the continuous piece of paper P. That is, using the drying drum 126 and the hot-air blowing device 128, the ink discharged onto the continuous piece of paper P is dried.

Next, in the cooling unit 22, the continuous piece of paper P having an image recorded thereon is cooled by the cooling roller 22A.

Next, the post-treatment unit 18 feeds out the continuous piece of paper P having an image recorded thereon on the winding roll 18A through the buffer unit 16.

Further, in the exemplary embodiment of the invention, the drying and the cooling above may not be carried out.

Through the steps above, an image is recorded with the ink on the continuous piece of paper P as a recording medium P.

Further, a system in which the liquid droplets of the ink are directly discharged onto the surface of the recording medium P by the discharge device 121 (discharge head 122) in the ink jet recording apparatus 10 is described above, but the present invention is not limited thereto. For example, after discharging the liquid droplets of the ink onto an intermediate transfer member, a system in which the liquid droplets of the ink on the intermediate transfer member are transferred to the recording medium P may be used.

Moreover, the ink jet recording apparatus 10 having a system in which an image is recorded by discharging the ink onto a flat paper as a recording medium P has been described above, but may also have a system in which an image is recorded by discharging the ink onto the continuous piece of paper P as a recording medium P.

[Ink]

The ink used in the present embodiment is an ink for ink jet recording, containing at least a colorant, a polymer particle, a water-soluble organic solvent, and water; and having a dynamic surface tension after 1 msec of 32 mN/m or less, a dynamic surface tension after 1 sec of less than 30 mN/m, and a variation width in the dynamic surface tensions for the period from 1 msec after to 1 sec after of from 0.2 mN/m to 3.0 mN/m, when the dynamic surface tension is measured by a maximum bubble pressure method.

Incidentally, the ink is an aqueous ink containing a water-soluble organic solvent and water.

The ink having a dynamic surface tension after 1 msec (millisecond) and after 1 sec (second) and a variation width in the dynamic surface tension is an ink having a small variation width in the dynamic surface tension, following a decrease in each dynamic surface tension. That is, this ink represents an ink having properties of being easily wet and diffused on a recording medium.

It is presumed that once discharged onto a permeable recording medium, the ink having properties of being easily wet and diffused in a recording medium and containing a polymer particle is rapidly wet and diffused on the recording medium and the penetration of the liquid components in the ink into the recording medium is promoted. In this case, it is presumed that the polymer particles which are solid in the ink delay infiltration into a recording medium (that is, among paper fibers), and thus, the interaction between the polymer particles becomes strong.

When the interaction between the polymer particles becomes strong, the viscosity near the polymer particles increases, the polymer particles easily remain on the surface of the recording medium, and are also hardly diffused along the surface direction (the direction along the surface) of the recording medium, and thus, a colorant which is a solid component of the ink is pulled into the interaction between the polymer particles, easily remains on the surface of the recording medium and is hardly diffused along the surface direction of the recording medium (the direction along the surface). In particular, it is presumed that since the ink has surface tension properties, when a part of the liquid component in the ink is absorbed in the recording medium, ink stability is easily decreased, separation of the liquid components and the solid components (the colorant and the polymer particles) in the ink is promoted. Further, these phenomena are likely to occur.

Therefore, it is presumed that the ink has excellent drying properties such that a drying unit is not required as well as excellent fixing properties due to the inclusion of polymer particles, and thus, the occurrence of peeling in an image is inhibited.

The dynamic surface tension after 1 msec in the ink used in the exemplary embodiment of the invention is 32 mN/m or less, and from the viewpoint of further inhibition of image blurring and image peeling, it is preferably from 20 mN/m to 29 mN/m and more preferably from 22 mN/m to 28 mN/m.

The dynamic surface tension after 1 sec in the ink used in the exemplary embodiment of the present invention is less than 30 mN/m, and from the viewpoint of further inhibition of image blurring and image peeling, it is preferably from 20 mN/m to 28.5 mN/m and more preferably from 22 mN/m to 27 mN/m.

The variation width of the dynamic surface tension for the period from 1 msec after to 1 sec after in the ink used in the present embodiment is from 0.2 mN/m to 3.0 mN/m, and from the viewpoint of further inhibition of image blurring and image peeling, it is preferably from 0.5 mN/m to 2.0 mN/m, and more preferably from 0.9 mN/m to 1.2 mN/m. In addition, for the variation width of the dynamic surface tension for the period from 1 msec after to 1 sec after, the value of the change decreases over time, and as a result, it equals a value obtained by subtracting the value of the dynamic surface tension after 1 sec from the value of the dynamic surface tension after 1 msec.

The dynamic surface tension in the exemplary embodiment of the invention is a value measured by a maximum bubble pressure method under an environment of 23° C. and 55% RH, using a dynamic surface tensiometer MPT C (manufactured by manufactured by LAUDA DR. R. WOBSER).

Further, the value of the dynamic surface tension after 1 msec is a value of the dynamic surface tension when it reaches a maximum bubble pressure after 1 msec from the formation of a new interface at a capillary edge. However, the measurement limit of the dynamic surface tensiometer in the maximum bubble pressure method, in the case of the dynamic surface tension after 1 msec, may be denoted as a dynamic surface tension after 0 msec in some cases. In this case, the value of the dynamic surface tension after 0 msec is adopted as a value of the dynamic surface tension after 1 msec.

On the other hand, the value of the dynamic surface tension after 1 sec is a value of the dynamic surface tension when it reaches a maximum bubble pressure after 1 sec from the formation of a new interface at a capillary edge. However, for the measurement limit of the dynamic surface tensiometer in the maximum bubble pressure method, in the case of the dynamic surface tension after less than 1 see, the value of the dynamic surface tension at the measurement limit is adopted as a value of the dynamic surface tension after 1 sec. The reason therefor is that with the value of the dynamic surface tension at the measurement limit, the dynamic surface tension can be considered to be in a stable region.

The static surface tension of the ink used in the exemplary embodiment of the invention is preferably less than 30 mN/m, and more preferably from 22 mN/m to 28 mN/m, from the viewpoint of discharge stability.

The static surface tension of the ink used in the present embodiment is a value measured under an environment of 23° C. and 55% RH, using a Wilhelm type surface tensiometer CBVP-Z (manufactured by Kyowa Interface Science Co., Ltd.).

—Surfactant—

In order to adjust the dynamic surface tension after 1 msec or after 1 sec and the variation width of the dynamic surface tension to the ranges above in the ink, it is preferable that the ink contains a surfactant. That is, it is preferable that the dynamic surface tension after 1 msec or after 1 see and the variation width of the dynamic surface tension are adjusted with the kind and amount of the surfactant.

Preferable examples of the surfactant used in the ink include surfactants having an HLB ("Hydrophile-Lipophile Balance") value of 14 or less. For example, by adjusting the amount of the surfactant having an HLB of 14 or less, it becomes easier to adjust the desired value to a static surface tension. In addition, from the viewpoint that an ink having a desired dynamic surface tension is easily prepared and the image peeling is further inhibition, the ink preferably contains 2 or more kinds of surfactants, more preferably contains 2 to 4 kinds of surfactants, still more preferably contains 2 or 3 kinds of surfactants, and particularly preferably contains 2 kinds of surfactants.

Moreover, the HLB ("Hydrophile-Lipophile Balance") value is defined by following equation (Griffin's method).

$$HLB = 20 \times (\text{sum of the molecular weight of hydrophilic moieties/Molecular weight})$$

Preferable examples of the surfactant include an ethylene oxide adduct of acetylene glycol, an ethylene oxide adduct of acetylene alcohol, and a polyether-modified silicone; more preferable examples thereof include an ethylene oxide adduct of acetylene glycol and a polyether-modified silicone; and still more preferable examples thereof include an ethylene oxide adduct of acetylene glycol and an ethylene oxide adduct of an acetylene alcohol.

The ethylene oxide adduct of acetylene glycol is, for example, a compound having an —O—$(CH_2CH_2O)_n$—H structure in which ethylene oxide is added to at least one hydroxyl group in acetylene glycol (for example, n represents an integer of 1 to 30).

Examples of the commercially available product of the ethylene oxide adduct of acetylene glycol (in which the numeral value in parenthesis represents a catalogue number of the HLB) include OLFINE E1004 (7 to 9), OLFINE E1010 (13 to 14), OLFINE EXP. 4001 (8 to 11), OLFINE EXP. 4123 (11 to 14), OLFINE EXP. 4300 (10 to 13), SURFYNOL 104H (4), SURFYNOL 420 (4), SURFYNOL 440 (4), and DYNOL 604 (8) (all manufactured by Nisshin Chemical Co., Ltd.).

The polyether-modified silicone is a compound in which a polyether group is bonded to a silicone chain (polysiloxane main chain) in a graft or block configuration. Examples of the polyether group include a polyoxyethylene group and a polyoxypropylene group. The polyether group may be, for example, a polyoxyalkylene group having an oxyethylene group and an oxypropylene group added in a block configuration or randomly.

Examples of the commercially available product of the polyether-modified silicone (in which the numeral value in parenthesis represents a catalogue number of the HLB) include SILFACE SAG 002 (12), SILFACE SAG 503A (11), and SILFACE SAG 005 (7) (all manufactured by Nisshin Chemical Co., Ltd.).

Among these, the ink preferably contains 2 or more kinds of compounds selected from a group of an ethylene oxide adduct of acetylene glycol, an ethylene oxide adduct of acetylene alcohol, and a polyether-modified silicone, more preferably contains 2 or more kinds of ethylene oxide adducts of acetylene glycol, and still more preferably contains 2 or more kinds of ethylene oxide adducts of acetylene glycol, as a surfactant.

Examples of the aforementioned other surfactant include an anionic surfactant, a nonionic surfactant, a cationic surfactant, and an amphoteric surfactant.

Examples of the anionic surfactant include alkylbenzene sulfonate, alkylphenyl sulfonate, alkylnaphthalene sulfonate, a higher fatty acid salt, a sulfate ester salt of a higher fatty acid ester, sulfonate of a higher fatty acid ester, a sulfate ester salt and sulfonate of a higher alcohol ether, higher alkyl sulfosuccinate, polyoxyethylene alkylether carboxylate, polyoxyethylene alkylether sulfate, alkyl phosphate, and polyoxyethylene alkyl ether phosphate.

Among them, preferable examples of the anionic surfactant include dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate.

Examples of the nonionic surfactant include a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerin fatty acid ester, a polyoxyethylene glycerin fatty acid ester, a polyglycerin fatty acid ester, a sucrose fatty acid ester, a polyoxyethylene alkylamine, polyoxyethylene fatty acid amide, alkylalkanol amide, a polyethylene glycol/polypropylene glycol block copolymer, and acetylene glycol.

Among these, preferable examples of the nonionic surfactant include a polyoxyethylene nonyl phenyl ether, a polyoxyethylene octyl phenyl ether, a polyoxyethylene dodecyl phenyl ether, a polyoxyethylene alkyl ether, a polyoxyethylene fatty acid ester, a sorbitan fatty acid ester, a polyoxyethylene sorbitan fatty acid ester, a fatty acid alkylolamide, a polyethylene glycol/polypropylene glycol block copolymer, and acetylene glycol.

Other examples of the nonionic surfactant include silicone-based surfactants such as a polysiloxane oxyethylene adduct; fluorine surfactants such as perfluoroalkyl carbonate, perfluoroalkyl sulfonate, and an oxyethyleneperfluoroalkyl ether; and biosurfactants such as spiculisporic acid, rhamnolipid, and lysolecithin.

The content of the surfactant in the ink is preferably from 0.01% by mass to 20% by mass, more preferably from 0.1% by mass to 10% by mass, still more preferably from 0.5% by mass to 8% by mass, and particularly preferably from 2% by mass to 5% by mass, with respect to the total weight of the ink. With the range above, a desired dynamic surface tension is easily prepared and the image peeling is further inhibited.

—Colorant—

The ink used in the exemplary embodiment of the invention contains a colorant.

Preferable examples of the colorant include a pigment.

Examples of the pigment include an organic pigment and an inorganic pigment, the pigment is not particularly limited, and a known pigment is used as the pigment.

Specific examples of a black pigment include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060 (all manufactured by Columbian Carbon Co., Ltd), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corporation), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black4 (all manufactured by Degussa Co., Ltd.), No. 25, No. 33, No. 40, No. 47, No. 52, No. 900, No. 2300, MCF-88, MA600, MA7, MA8, and MA100 (all manufactured by Mitsubishi Chemical Corporation), but the present invention is not limited thereto.

Specific examples of a cyan color pigment include C.I. Pigment Blue 1, 2, 3, 15, 15:1, 15:2, 15:3, 15:4, 16, 22, and 60, but the present invention is not limited thereto.

Specific examples of a magenta color pigment include C.I. Pigment Red 5, 7, 12, 48, 48:1, 57, 112, 122, 123, 146, 168, 177, 184, and 202, and C. 1. Pigment Violet 19, but the present invention is not limited thereto.

Specific examples of a yellow pigment include C.I. Pigment Yellow 1, 2, 3, 12, 13, 14, 16, 17, 73, 74, 75, 83, 93, 95, 97, 98, 114, 128, 129, 138, 151, 154, and 180, but the present invention is not limited thereto.

Here, in the case where the pigment is used as a pigment, the ink preferably contains a pigment dispersant. Examples of the pigment dispersant to be used include a polymer dispersant, an anionic surfactant, a cationic surfactant, an amphoteric surfactant, and a nonionic surfactant.

As the polymer dispersant, a polymer having a moiety in a hydrophilic structure moiety and a moiety of a hydrophobic structure is appropriately used. As the polymer having the moiety in a hydrophilic structure and the moiety in a hydrophobic structure, a fused polymer or an addition polymer may be used. Examples of the fused polymer include a conventionally known polyester-based dispersant. Examples of the addition polymer include an addition polymer of monomers having an $\alpha,\beta$-ethylenically unsaturated group. By copolymerizing a monomer having an $\alpha,\beta$-ethylenically unsaturated group having a hydrophilic group and a monomer having an $\alpha,\beta$-ethylenically unsaturated group having a hydrophobic group in combination, a required polymer dispersant may be obtained. Further, a homopolymer of monomers having an $\alpha,\beta$-ethylenically unsaturated group having a hydrophilic group may be used.

Examples of the monomer having an $\alpha,\beta$-ethylenically unsaturated group having a hydrophilic group include monomers having a carboxyl group, a sulfonate group, a hydroxyl group, a phosphate group or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxy ethyl phosphate, methacryloxy ethyl phenyl acid phosphate, ethylene glycol dimethacrylate, and diethylene glycol dimethacrylate.

Examples of the monomer having an $\alpha,\beta$-ethylenically unsaturated group having a hydrophobic group include styrene derivatives such as styrene, $\alpha$-methylstyrene, and vinyl toluene, vinyl cyclohexane, vinyl naphthalene, vinyl naphthalene derivatives, an alkyl acrylate ester, an alkyl methacrylate ester, a phenyl methacrylate ester, a cycloalkyl methacrylate ester, an alkyl crotonate ester, a dialkyl itaconate ester, and a dialkyl maleate ester.

Preferable examples of the copolymer as the polymer dispersant include a styrene-styrene sulfonic acid copolymer, a styrene-maleic acid copolymer, a styrene-methacrylic acid copolymer, a styrene-acrylic acid copolymer, a vinyl-naphthalene-maleic acid copolymer, a vinyl naphthalene-methacrylic acid copolymer, a vinylnaphthalene-acrylic acid copolymer, an alkyl acrylate ester-acrylic acid copolymer, an alkyl methacrylate ester-methacrylic acid copolymer, a styrene-alkyl methacrylate ester-methacrylic acid copolymer, a styrene-alkyl acrylate ester-acrylic acid copolymer, a styrene-phenyl methacrylate ester-methacrylic acid copolymer, a styrene-cyclohexyl methacrylate ester-methacrylic acid copolymer, and salts thereof. Further, these polymers may be copolymerized with a monomer having a polyoxyethylene group, or a hydroxyl group.

Among these, the ink used in the exemplary embodiment of the invention preferably contains a neutralization product of a styrene-acrylic acid copolymer, more preferably contains a neutralization product of a styrene-acrylic acid copolymer in the amount of 0.1% by mass to 10% by mass, with respect to the total weight of the ink; and still more preferably contains a neutralization product of a styrene-acrylic acid copolymer in the amount of 0.5% by mass to 5% by mass, with respect to the total weight of the ink.

As the neutralization product of a styrene-acrylic acid copolymer, an alkali metal salt of a styrene-acrylic acid copolymer is preferable, and a sodium salt of a styrene-acrylic acid copolymer is more preferable.

The weight average molecular weight (Mw) of the polymer dispersant is preferably from 2,000 to 50,000.

These pigment dispersant may be used alone or in combination of two or more kinds thereof.

The content of the pigment dispersant cannot be unconditionally determined because it largely varies according to the pigment. However, the content thereof is preferably from 0.1 part by weight to 100 parts by weight with respect to 100 parts by weight of the pigment.

Examples of the pigment include a self-dispersible pigment in water (hereinafter, referred to as a "self-dispersion type pigment").

The self-dispersion type pigment refers to a pigment having water-solubilizing groups on the pigment surface, which can be dispersed in water even without the polymer dispersant. The self-dispersion type pigment, for example, is obtained by carrying out surface modification treatments, such as an acid/base treatment, a coupling agent treatment, a polymer graft treatment, a plasma treatment, and an oxidation/reduction treatment, on a pigment.

Examples of the self-dispersion type pigment may include, in addition to the above described surface modified pigment to which the surface modification treatments are performed, commercially available self dispersion pigments such as Cab-o-jet-200, Cab-o-jet-300, Cab-o-jet-400, UX-157, IJX-253, UX-266, UX-273, UX-444, UX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M, all manufactured by Cabot Corporation, and Microjet Black CW1 and CW-2, both manufactured by Orient Chemical Co., Ltd.

As the self-dispersion type pigment, a pigment at least having sulfonic acid, sulfonate, carboxylic acid, or carboxylate as a functional group on the surface thereof is preferable; and a pigment at least having carboxylic acid or carboxylate as a functional group on the surface thereof is more preferable.

Here, examples of the pigment include a pigment coated with a resin. The pigment may be a microcapsule pigment, such as commercially available microcapsule pigments manufactured by DIC Corporation, Toyo Ink Co., Ltd., or the like. The present invention is not limited to the commercially available microcapsule pigments, and microcapsule pigments prepared depending on their purposes may be used.

Examples of the pigment further include a resin-dispersion type pigment having a polymer compound physically adsorbed or chemically bonded to the pigment.

Examples of the pigment further include, other than a black pigment and three primary color pigments of cyan, magenta, and yellow, specific color pigments such as red, green, blue, brown, and white, metallic luster pigments such as gold and silver, colorless or light-colored extender pigments, and plastic pigments.

Examples of the pigment further include particles obtained by fixing a dye or a pigment onto the surface of silica, alumina, or polymer beads as a core, an insoluble lake product of a dye, a colored emulsion, and a colored latex.

Examples of the colorant include, other than the pigment, dyes such as a hydrophilic anionic dye, a direct dye, a cationic dye, a reactive dye, a polymer dye, and an oil soluble dye, wax-resin powder or emulsions colored by a dye, a fluorescent dye, and a fluorescent pigment.

The volume average particle size of the colorant is preferably, for example, from 10 nm to 1,000 nm.

The volume average particle diameter of the colorant refers to a particle diameter of a colorant itself, or a particle diameter of a colorant adhered with an additive in the case where the additive such as a dispersant is adhered to the colorant. The measurement of the volume average particle diameter is carried out by an MICROTRAC UPA particle size analyzer UPA-UT151 (manufactured by Microtrac Inc.). The measurement is carried out by putting a 1,000-fold diluted ink in a measuring cell. Further, as an input value at the time of the measurement, the viscosity is input as the viscosity of the diluted ink and the refractive index of the particles is input as the refractive index of the colorant.

The content (concentration) of the colorant is preferably from 1% by weight to 25% by weight, and more preferably from 2% by weight to 20% by weight, with respect to the total weight of the ink. (In this specification, mass ratio is equal to weight ratio.)

—Polymer Particle—

The ink used in the exemplary embodiment of the invention contains a polymer particle.

The polymer particle is a component that increases the fixability of an image to a non-permeable recording medium by an ink.

Examples of the polymer particle include particles (latex particles) of a styrene-acrylic acid copolymer, a styrene-acrylic acid-sodium acrylate copolymer, a styrene-butadiene copolymer, polystyrene, an acrylonitrile-butadiene copolymer, an acrylic ester copolymer, polyurethane, a silicone-acrylic acid copolymer, an acryl-modified fluorine resin, or the like. Further, examples of the polymer particles include core/shell type polymer particles having different compositions between the core and the shell of the particles.

The polymer particle may be dispersed in an ink with a use of an emulsifier or dispersed in an ink without a use of an emulsifier. Examples of the emulsifier include surfactants, polymers having hydrophilic groups such as a sulfonic acid group and a carboxyl group (for example, polymers having hydrophilic groups graft-boned thereto, and polymers obtained from the monomers having hydrophilicity and monomers having hydrophobic moieties).

The volume average particle diameter of the polymer particle is preferably from 10 nm to 300 nm, and more preferably from 10 nm to 200 nm, from the viewpoints of glossiness and scratch resistance of an image.

The measurement of the volume average particle diameter of the polymer particle in the exemplary embodiment of the invention is carried out by an MICROTRAC UPA particle size analyzer UPA-UT151 (manufactured by Microtrac Inc.). The measurement is carried out by putting a 1,000-fold diluted ink in a measuring cell. Further, as an input value at the time of the measurement, the viscosity is input as the viscosity of the diluted ink and the refractive index of the particles is input as the refractive index of the polymer.

The glass transition temperature of the polymer particle is preferably from −20° C. to 80° C., and more preferably from −10° C. to 60° C., from the viewpoint of the scratch resistance of an image.

The glass transition temperature of the polymer particle is determined from a DSC curve obtained by differential scanning calorimetry (DSC). Specifically, the glass transition temperature is determined from the "extrapolated glass transition onset temperature" described in the method of obtaining a glass transition temperature in the "Testing Methods for Glass Transition Temperatures of Plastics" in JIS K7121-1987.

The content of the polymer particle is preferably from 0.1% by weight to 10% by weight, and more preferably from 0.5% by weight to 5% by weight, with respect to the total weight of the ink.

—Water—

The ink used in the exemplary embodiment of the invention contains water.

Suitable examples of water include ion exchange water, ultrapure water, distilled water, and ultrafiltrated water, particularly from the viewpoint of preventing incorporation of impurities or generation of microbes.

The content of water is preferably from 10% by weight to 95% by weight, and more preferably from 30% by weight to 90% by weight, with respect to the total weight of the ink.

—Water-Soluble Organic Solvent—

The ink in the exemplary embodiment of the invention contains a water-soluble organic solvent.

Examples of the water-soluble organic solvent include polyhydric alcohols, polyhydric alcohol derivatives, nitrogen-containing solvents, alcohols, and sulfur-containing solvents. Other examples of the water-soluble organic solvent include propylene carbonate and ethylene carbonate.

Examples of the polyhydric alcohols include sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Examples of the nitrogen-containing solvent include pyrrolidone, N-methyl-2-pyrrolidone, cyclohexyl pyrrolidone, and triethanol amine.

Examples of the alcohols include ethanol, isopropyl alcohol, butyl alcohol, and benzyl alcohol.

Examples of the sulfur-containing solvents include thiodiethanol, thiodiglycerol, sulfolane, and dimethyl sulfoxide.

The water-soluble organic solvent may be contained alone or in combination of two or more kinds thereof.

The content of the water-soluble organic solvent is preferably from 0.1% by mass to 60% by mass, more preferably from 1% by mass to 50% by mass, still more preferably from 5% by mass to 40% by mass, and particularly 10% by mass to 30% by mass, based on the total mass of the ink.

—Other Additives—

The ink used in the exemplary embodiment of the invention may contain additives other than the aforementioned additives.

Such other additives are not particularly limited and known additives are used. Specific examples thereof include ink dischargeability improving agents (polyethylene imine, polyamines, polyvinyl pyrrolidone, polyethylene glycol, ethyl cellulose, carboxy methyl cellulose, or the like), conductivity/pH adjusting agents (compounds of alkali metals such as potassium hydroxide, sodium hydroxide and lithium hydroxide), reactive dilution solvents, a penetrating agent, a pH buffer, an antioxidant, a fungicide, a viscosity adjusting agent, a conductive agent, a chelating agent, an ultraviolet absorbent, and an infrared absorbent.

The pH of the ink used in the exemplary embodiment of the invention is preferably from 4 to 10, and more preferably from 5 to 9.

As the pH of the ink, a value measured by a pH/conductivity meter (MPC227 manufactured by Mettler-Toledo International Inc.) under an environment of a temperature of 23±0.5° C. and a humidity of 55±5% RH environment.

The conductivity of the ink used in the exemplary embodiment of the invention is preferably from 0.01 S/m to 0.5 S/m, more preferably from 0.01 S/m to 0.25 S/m, and still more preferably from 0.01 S/m to 0.20 S/m.

The measurement of the conductivity is carried out by MPC227 (pH/Conductivity Meter, manufactured by Mettler-Toledo International Inc.).

The viscosity of the ink used in the exemplary embodiment of the invention is preferably from 1.5 mPa·s to 30 mPa·s, and more preferably from 1.5 mPa·s to 20 mPa·s.

The viscosity is measured, using TV-20 (manufactured by Toki Sangyo Co., Ltd.) as a measurement device under the conditions of a measurement temperature of 23° C. and a shear rate of 1,400 $s^{-1}$.

EXAMPLES

Hereinafter, the present embodiments will be described in detail with reference to Examples, but the present embodiment is not limited to Examples shown below. Further, in the following description, "part(s)" denote(s) "part(s) by weight" unless otherwise indicated.

[Method for Measuring Dynamic Surface Tension of Ink]

The dynamic surface tension is measured under an environment of 23° C. and 55% RH, using a maximum bubble pressure method dynamic surface tensiometer MPT C (manufactured by manufactured by LAUDA DR. R. WOBSER).

The value of the dynamic surface tension after 1 msec is taken as a value of the dynamic surface tension when it reaches a maximum bubble pressure after 1 msec from the formation of a new interface at a capillary edge. However, the measurement limit of the dynamic surface tensiometer in the maximum bubble pressure method, in the case of the dynamic surface tension after 1 msec, may be denoted as a dynamic surface tension after 0 msec in some cases. In this case, the value of the dynamic surface tension after 0 msec is adopted as a value of the dynamic surface tension after 1 msec.

On the other hand, the value of the dynamic surface tension after 1 sec is taken as a value of the dynamic surface tension when it reaches a maximum bubble pressure after 1 sec from the formation of a new interface at a capillary edge. However, for the measurement limit of the dynamic surface tensiometer in the maximum bubble pressure method, in the case of the dynamic surface tension after less than 1 sec, the value of the dynamic surface tension at the measurement limit is adopted as a value of the dynamic surface tension after 1 sec.

[Preparation of Ink 1 for Ink Jet]

Carbon black (Mogul L: manufactured by Cabot Corporation): 5% by mass

Neutralization product of styrene-sodium acrylate copolymer (Mw=30,000, manufactured by BASF Corporation): 2.5% by mass Acryl-based emulsion (acryl resin particles, W-4627: manufactured by TOYOCHEM Co., Ltd.: 5% by mass (solid contents))

Glycerin (manufactured by Wako Pure Chemical Industries, Ltd.): 10% by mass

Diethylene glycol (manufactured by Wako Pure Chemical Industries, Ltd.): 10% by mass OLFINE E1010 (acetylene glycol-based surfactant, ethylene oxide adduct of acetylene glycol, HLB value=13 to 14, manufactured by Nisshin Chemical Co., Ltd.): 2% by mass OLFINE EXP. 4123 (acetylene glycol-based surfactant, ethylene oxide adduct of acetylene glycol, HLB value=11 to 14, manufactured by Nisshin Chemical Co., Ltd.): 2% by mass Ion exchange water: Balance The aforementioned components are mixed to prepare an ink 1 for ink jet.

The values measured for the dynamic surface tension of the ink 1 for ink jet are summarized in Table 1.

[Preparation of Ink 2 for Ink Jet]

An ink 2 for ink jet is prepared in the same manner as for the ink 1 for ink jet except that OLFINE EXP. 4123: 2% by mass is changed to OLFINE EXP. 4001 (acetylene glycol-based surfactant, ethylene oxide adduct of acetylene glycol, HLB value=8 to 11, manufactured by Nisshin Chemical Co., Ltd.): 1% by mass and ion exchange water: 1% by mass.

[Preparation of Ink 3 for Ink Jet]

Carbon black (Mogul L: manufactured by Cabot Corporation): 5% by mass

Neutralization product of styrene-sodium acrylate copolymer (Mw=30,000, manufactured by BASF Corporation): 2.5% by mass Glycerin (manufactured by Wako Pure Chemical Industries, Ltd.): 10% by mass Diethylene glycol (manufactured by Wako Pure Chemical Industries, Ltd.): 10% by mass Diethylene glycol monobutyl ether (manufactured by Wako Pure Chemical Industries, Ltd.): 3% by mass OLFINE E1010: 1% by mass Ion exchange water: Balance The aforementioned components are mixed to prepare an ink 3 for ink jet.

[Preparation of Ink 4 for Ink Jet]

An ink 4 for inkjet is prepared in the same manner as for the ink 3 for inkjet except that OLFINE E1010: 1% by mass is changed to OLFINE EXP. 4300 (acetylene glycol-based surfactant, ethylene oxide adduct of acetylene glycol, HLB value=10 to 13, manufactured by Nisshin Chemical Co., Ltd.): 1% by mass.

[Ink Jet Recording Apparatus]

(Recording Apparatus)

By the same configuration as that shown in FIGURE, a recording apparatus provided (equipped) with a piezo head at 600 dpi (a maximum ink droplet amount of 11 pl) is prepared as a discharge head of an ink.

In an ink jet recording apparatus having no drying unit, at a recording speed of 10 m/min, 20 m/min, 30 m/min, 50 m/min, or 70 m/min, a piezo head at 600 dpi (maximum droplet amount of 11 pl) is used as a printing head.

As a recording medium, each roll paper of NPi Form Next-IJ (basis mass of 81.4 g/m$^2$) or NPi Form (basis mass of 81.4 g/m$^2$), manufactured by Nippon Paper Group, Inc., is used.

[Evaluation of Image Peeling]

For the image after printing, the presence or absence of the image peeling is evaluated.

A: There is no peeling.
B: There is slight peeling.
C: There is partly peeling.
D: The peeling is clearly contaminated.

Example 1

Using the ink 1 for ink jet recording as an ink and NPi Form Next-IJ (basis mass of 81.4 g/m$^2$) as a recording medium, printing is carried out with the ink jet recording apparatus. Using the obtained image, the image peeling is evaluated. The evaluation results are shown in Table 1.

Example 2

Using the ink 1 for ink jet recording as an ink and NPi Form (basis mass of 81.4 g/m) as a recording medium, printing is carried out with the ink jet recording apparatus. Using the obtained image, the image peeling is evaluated. The evaluation results are shown in Table 1.

Example 3

In the same manner as in Example 1 except that the ink is changed to the ink 2 for ink jet recording, the printing and the evaluation are carried out. The evaluation results are shown in Table 1.

Example 4

In the same manner as in Example 2 except that the ink is changed to the ink 2 for ink jet recording, the printing and the evaluation are carried out. The evaluation results are shown in Table 1.

Comparative Example 1

In the same manner as in Example 1 except that the ink is changed to the ink 3 for ink jet recording, the printing and the evaluation are carried out. The evaluation results are shown in Table 1.

Comparative Example 2

In the same manner as in Example 2 except that the ink is changed to the ink 3 for ink jet recording, the printing and the evaluation are carried out. The evaluation results are shown in Table 1.

Comparative Example 3

In the same manner as in Example 1 except that the ink is changed to the ink 4 for ink jet recording, the printing and the evaluation are carried out. The evaluation results are shown in Table 1.

Comparative Example 4

In the same manner as in Example 2 except that the ink is changed to the ink 4 for ink jet recording, the printing and the evaluation are carried out. The evaluation results are shown in Table 1.

Example 5

Preparation of Ink 5 for Ink Jet

Carbon black (Mogul L: manufactured by Cabot Corporation): 5% by mass
Neutralization product of styrene-sodium acrylate copolymer (Mw=30,000, manufactured by BASF Corporation): 2.5% by mass
Urethane-based emulsion (urethane resin particles, SF210: manufactured by Dai-Ichi Kogyo Seiyaku Co., Ltd.: 5% by mass (solid contents))
Glycerin (manufactured by Wako Pure Chemical Industries, Ltd.): 10% by mass
Diethylene glycol (manufactured by Wako Pure Chemical Industries, Ltd.): 10% by mass
OLFINE E1004 (acetylene glycol-based surfactant, ethylene oxide adduct of acetylene glycol, HLB value=7 to 9, manufactured by Nisshin Chemical Co., Ltd.): 0.5% by mass
Ion exchange water: Balance
The aforementioned components are mixed to prepare an ink 5 for ink jet.
In the same manner as in Example 1 except that the ink is changed to the ink 5 for ink jet recording, the printing and the evaluation are carried out. The evaluation results are shown in Table 1.

Example 6

Preparation of Ink 6 for Ink Jet

Carbon black (Mogul L: manufactured by Cabot Corporation): 5% by mass
Neutralization product of styrene-sodium acrylate copolymer (Mw=30,000, manufactured by BASF Corporation): 2.5% by mass
Urethane-based emulsion (urethane resin particles, SF210: manufactured by Dai-Ichi Kogyo Seiyaku Co., Ltd.: 5% by mass (solid contents))
Glycerin (manufactured by Wako Pure Chemical Industries, Ltd.): 10% by mass
Diethylene glycol (manufactured by Wako Pure Chemical Industries, Ltd.): 10% by mass
OLFINE E1010 (acetylene glycol-based surfactant, ethylene oxide adduct of acetylene glycol, HLB value=13 to 14, manufactured by Nisshin Chemical Co., Ltd.): 2% by mass
OLFINE EXP. 4123 (acetylene glycol-based surfactant, ethylene oxide adduct of acetylene glycol, HLB value=11 to 14, manufactured by Nisshin Chemical Co., Ltd.): 2% by mass
Ion exchange water: Balance
The aforementioned components are mixed to prepare an ink 6 for ink jet.
In the same manner as in Example 1 except that the ink is changed to the ink 6 for ink jet recording, the printing and the evaluation are carried out. The evaluation results are shown in Table 1.

Example 7

Preparation of Ink 7 for Ink Jet

Carbon black (Mogul L manufactured by Cabot Corporation): 5% by mass
Neutralization product of styrene-sodium acrylate copolymer (Mw=30,000, manufactured by BASF Corporation): 2.5% by mass
Acryl-based emulsion (acryl resin particles, Movinyl 730: manufactured by The Nippon Synthetic Chemical Industry Co., Ltd.: 5% by mass (solid contents))
Glycerin (manufactured by Wako Pure Chemical Industries, Ltd.): 10% by mass
Diethylene glycol (manufactured by Wako Pure Chemical Industries, Ltd.): 10% by mass
OLFINE E1010 (acetylene glycol-based surfactant, ethylene oxide adduct of acetylene glycol, HLB value=13 to 14, manufactured by Nisshin Chemical Co., Ltd.): 2% by mass
OLFINE EXP. 4123 (acetylene glycol-based surfactant, ethylene oxide adduct of acetylene glycol, HLB value=11 to 14, manufactured by Nisshin Chemical Co., Ltd.): 2% by mass
Ion exchange water: Balance
The aforementioned components are mixed to prepare an ink 7 for ink jet.
In the same manner as in Example 1 except that the ink is changed to the ink 7 for ink jet recording, the printing and the evaluation are carried out. The evaluation results are shown in Table 1.

Example 8

In the same manner as in Example 1 except that NPi Form Next-U (basis mass of 64 g/m$^2$) is used as a recording medium, the printing and the evaluation are carried out. The evaluation results are shown in Table 1.

Comparative Example 5

Preparation of Ink 8 for Ink Jet

Carbon black (Mogul L: manufactured by Cabot Corporation): 5% by mass
Neutralization product of styrene-sodium acrylate copolymer (Mw=30,000, manufactured by BASF Corporation): 2.5% by mass
Acryl-based emulsion (acryl resin particles, Movinyl 730: manufactured by The Nippon Synthetic Chemical Industry Co., Ltd.: 5% by mass (solid contents))
Glycerin (manufactured by Wako Pure Chemical Industries, Ltd.): 10% by mass
Diethylene glycol (manufactured by Wako Pure Chemical Industries, Ltd.): 10% by mass
OLFINE EXP. 4123 (acetylene glycol-based surfactant, ethylene oxide adduct of acetylene glycol, HLB value=11 to 14, manufactured by Nisshin Chemical Co., Ltd.): 5% by mass
Ion exchange water: Balance
The aforementioned components are mixed to prepare an ink 8 for ink jet.
In the same manner as in Example 1 except that the ink is changed to the ink 8 for ink jet recording, the printing and the evaluation are carried out. The evaluation results are shown in Table 1.

TABLE 1

| | Dynamic surface tension (1 msec) mN/m | Dynamic surface tension (1 sec) mN/m | Variation width of dynamic surface tension mN/m | Evaluation of image peeling by difference in recording speed | | | | |
|---|---|---|---|---|---|---|---|---|
| | | | | 10 m/min | 20 m/min | 30 m/min | 50 m/min | 70 m/min |
| Example 1 | 27.7 | 26.5 | 1.2 | A | A | A | B | C |
| Example 2 | 27.7 | 26.5 | 1.2 | A | A | A | B | C |
| Example 3 | 29.0 | 28.2 | 0.8 | A | A | B | B | C |
| Example 4 | 29.0 | 28.2 | 0.8 | A | A | B | B | C |
| Example 5 | 26.8 | 26.0 | 0.8 | A | A | B | B | C |
| Example 6 | 27.9 | 26.8 | 1.1 | A | A | A | B | C |
| Example 7 | 27.6 | 26.7 | 0.9 | A | A | A | B | C |
| Example 8 | 27.7 | 26.5 | 1.2 | A | A | A | B | C |
| Comparative Example 1 | 38.2 | 36.5 | 1.7 | C | D | D | D | D |
| Comparative Example 2 | 38.2 | 36.5 | 1.7 | C | C | D | D | D |
| Comparative Example 3 | 36.0 | 32.1 | 3.9 | D | D | D | D | D |
| Comparative Example 4 | 36.0 | 32.1 | 3.9 | D | D | D | D | D |
| Comparative Example 5 | 30.0 | 26.0 | 4.0 | D | D | D | D | D |

What is claimed is:

1. An ink jet recording apparatus equipped with an ink for ink jet recording, and
a discharge unit that discharges a liquid droplet of the ink onto a recording medium,
wherein the ink contains at least a colorant, a polymer particle, a water-soluble organic solvent, and water, and the ink has a dynamic surface tension after 1 msec of 32 mN/m or less, the dynamic surface tension after 1 msec being a dynamic surface tension when a bubble pressure reaches a maximum bubble pressure after 1 msec from a formation of a new interface at a capillary edge, when the dynamic surface tension is measured by a maximum bubble pressure method, the ink has a dynamic surface tension after 1 sec of less than 30 mN/m, the dynamic surface tension after 1 sec being a dynamic surface tension when a bubble pressure reaches a maximum bubble pressure after 1 sec from a formation of a new interface at a capillary edge, when the dynamic surface tension is measured by a maximum bubble pressure method, and the ink has a variation width in the dynamic surface tension for the period from 1 msec after to 1 sec after of from 0.2 mN/m to 3.0 mN/m,
a recording speed is from 10 m/min to 50 m/min.

2. The ink jet recording apparatus according to claim 1, wherein the recording medium is a roll of paper.

3. An ink jet recording method, comprising:
a discharge step that discharges a liquid droplet of an ink onto a recording medium,
wherein the ink contains at least a colorant, a polymer particles, a water-soluble organic solvent, and water, and the ink has a dynamic surface tension after 1 msec of 32 mN/m or less, the dynamic surface tension after 1 msec being a dynamic surface tension when a bubble pressure reaches a maximum bubble pressure after 1 msec from a formation of a new interface at a capillary edge, when the dynamic surface tension is measured by a maximum bubble pressure method, the ink has a dynamic surface tension after 1 sec of less than 30 mN/m, the dynamic surface tension after 1 sec being a dynamic surface tension when a bubble pressure reaches a maximum bubble pressure after 1 sec from a formation of a new interface at a capillary edge, when the dynamic surface tension is measured by a maximum bubble pressure method, and the ink has a variation width in the dynamic surface tension for the period from 1 msec after to 1 sec after of from 0.2 mN/m to 3.0 mN/m,
a recording speed is from 10 m/min to 50 m/min.

4. The ink jet recording method according to claim 3, wherein the recording medium is a roll of paper.

5. The ink jet recording apparatus according to claim 1, wherein the ink further comprises a surfactant with a HLB value of 14 or less.

6. The ink jet recording method according to claim 3, wherein the ink further comprises a surfactant with a HLB value of 14 or less.

* * * * *